United States Patent
Hayashide

(10) Patent No.: US 9,338,322 B2
(45) Date of Patent: May 10, 2016

(54) IMAGE READING DEVICE AND IMAGE FORMING APPARATUS INCLUDING AN ILLUMINATING UNIT AND AN ALIGNING PORTION FOR POSITIONING AN ORIGINAL

(71) Applicant: CANON KABUSHIKI KAISHA, Tokyo (JP)

(72) Inventor: Tadao Hayashide, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/299,532

(22) Filed: Jun. 9, 2014

(65) Prior Publication Data

US 2014/0362423 A1  Dec. 11, 2014

(30) Foreign Application Priority Data

Jun. 11, 2013 (JP) ................................. 2013-123216
Jun. 11, 2013 (JP) ................................. 2013-123217

(51) Int. Cl.
*H04N 1/04* (2006.01)
*H04N 1/028* (2006.01)
*H04N 1/00* (2006.01)

(52) U.S. Cl.
CPC ....... *H04N 1/02885* (2013.01); *H04N 1/00827* (2013.01); *H04N 1/0281* (2013.01); *H04N 1/0284* (2013.01); *H04N 1/0285* (2013.01); *H04N 1/0289* (2013.01); *H04N 1/02825* (2013.01); *H04N 1/02835* (2013.01); *H04N 1/02895* (2013.01); *H04N 2201/0432* (2013.01)

(58) Field of Classification Search
CPC .......... H04N 1/02885; H04N 1/00827; H04N 1/0281; H04N 1/02825; H04N 1/02835; H04N 1/0284; H04N 1/0285; H04N 1/0289; H04N 1/02895; H04N 2201/0432

USPC ......... 358/475, 484, 497, 471, 401, 400, 509, 358/505, 501, 500; 399/379, 380, 220, 221; 355/67–69; 250/227.11, 234–236, 239, 250/216

See application file for complete search history.

(56) References Cited

U.S. PATENT DOCUMENTS

| | | | | |
|---|---|---|---|---|
| 6,081,351 | A * | 6/2000 | Tabata | 358/475 |
| 6,473,154 | B2 * | 10/2002 | Tabata et al. | 355/41 |
| 7,551,332 | B2 * | 6/2009 | Itoi | 358/497 |
| 8,482,824 | B2 * | 7/2013 | Nagasaka | 358/509 |
| 8,837,009 | B2 * | 9/2014 | Kawasaki | G02B 5/0215 345/690 |
| 8,928,955 | B2 * | 1/2015 | Minamikawa | H04N 1/02815 358/475 |

(Continued)

FOREIGN PATENT DOCUMENTS

| CN | 1831423 A | 9/2006 |
|---|---|---|
| DE | 3833371 A1 | 4/1990 |

(Continued)

*Primary Examiner* — Cheukfan Lee
(74) *Attorney, Agent, or Firm* — Canon USA Inc. IP Division

(57) ABSTRACT

An image reading device includes a platen on which an original is to be placed, an illuminating unit configured to illuminate the original, a linear sensor configured to receive light from the original, an optical unit configured to guide the light from the original to the linear sensor, and an aligning portion configured to determine a position of the original in a long-side direction of the linear sensor. The illuminating unit includes a light-guiding member extending in the long-side direction of the linear sensor, and a light source provided only at one long-side end of the light-guiding member. The aligning portion is provided on a side opposite to the light source in the long-side direction of the light-guiding member.

11 Claims, 11 Drawing Sheets

(56) References Cited

U.S. PATENT DOCUMENTS

| | | |
|---|---|---|
| 2010/0277776 A1 | 11/2010 | Osakabe |
| 2011/0267659 A1 | 11/2011 | Kawano |
| 2011/0286699 A1 | 11/2011 | Sanada |
| 2012/0147402 A1 | 6/2012 | Tan |
| 2014/0111835 A1* | 4/2014 | Ozawa et al. ............ 358/475 |

FOREIGN PATENT DOCUMENTS

| | | |
|---|---|---|
| JP | 2008-078855 A | 4/2008 |
| JP | 2010-124118 A | 6/2010 |
| JP | 2011-071696 A | 4/2011 |
| JP | 2012-160940 A | 8/2012 |

* cited by examiner

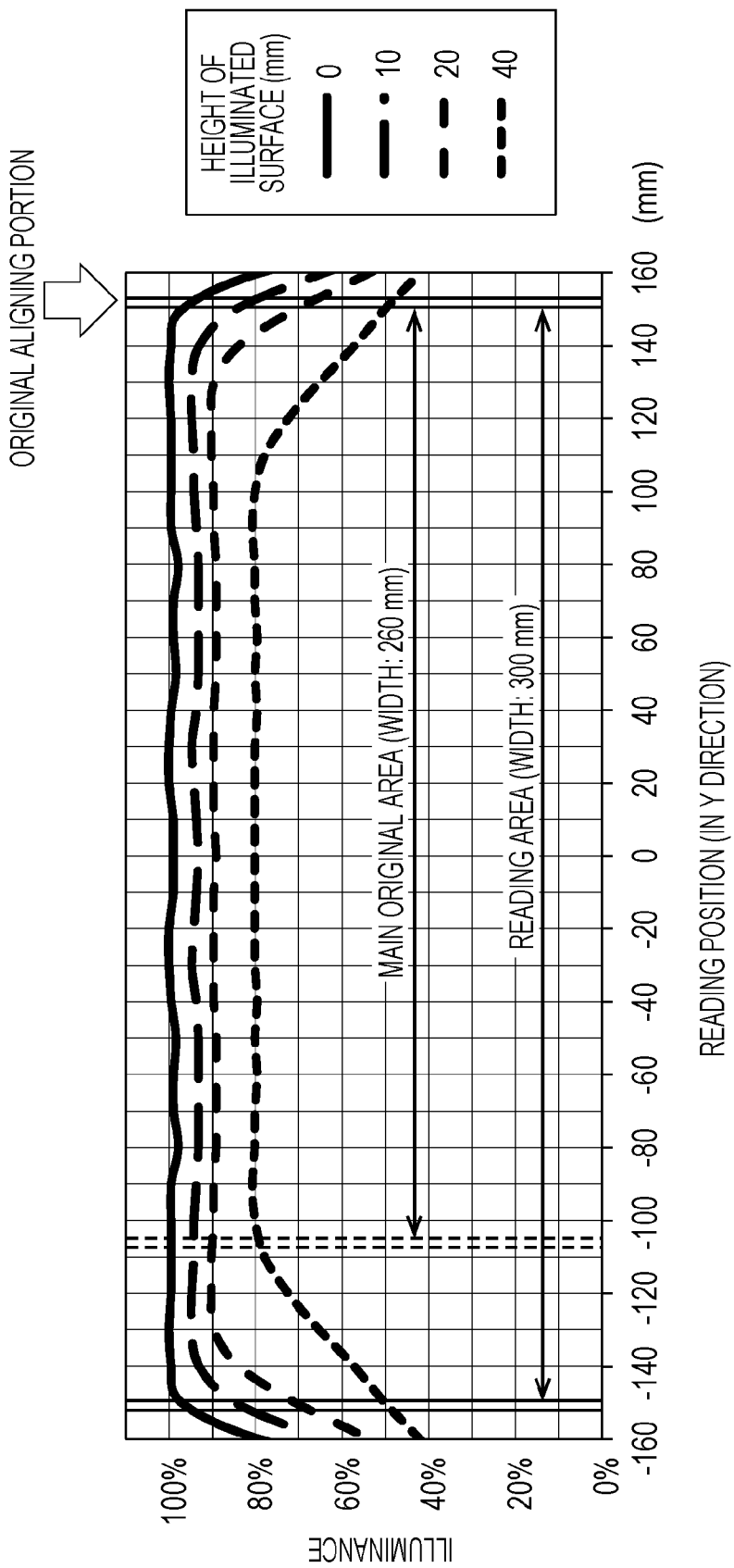

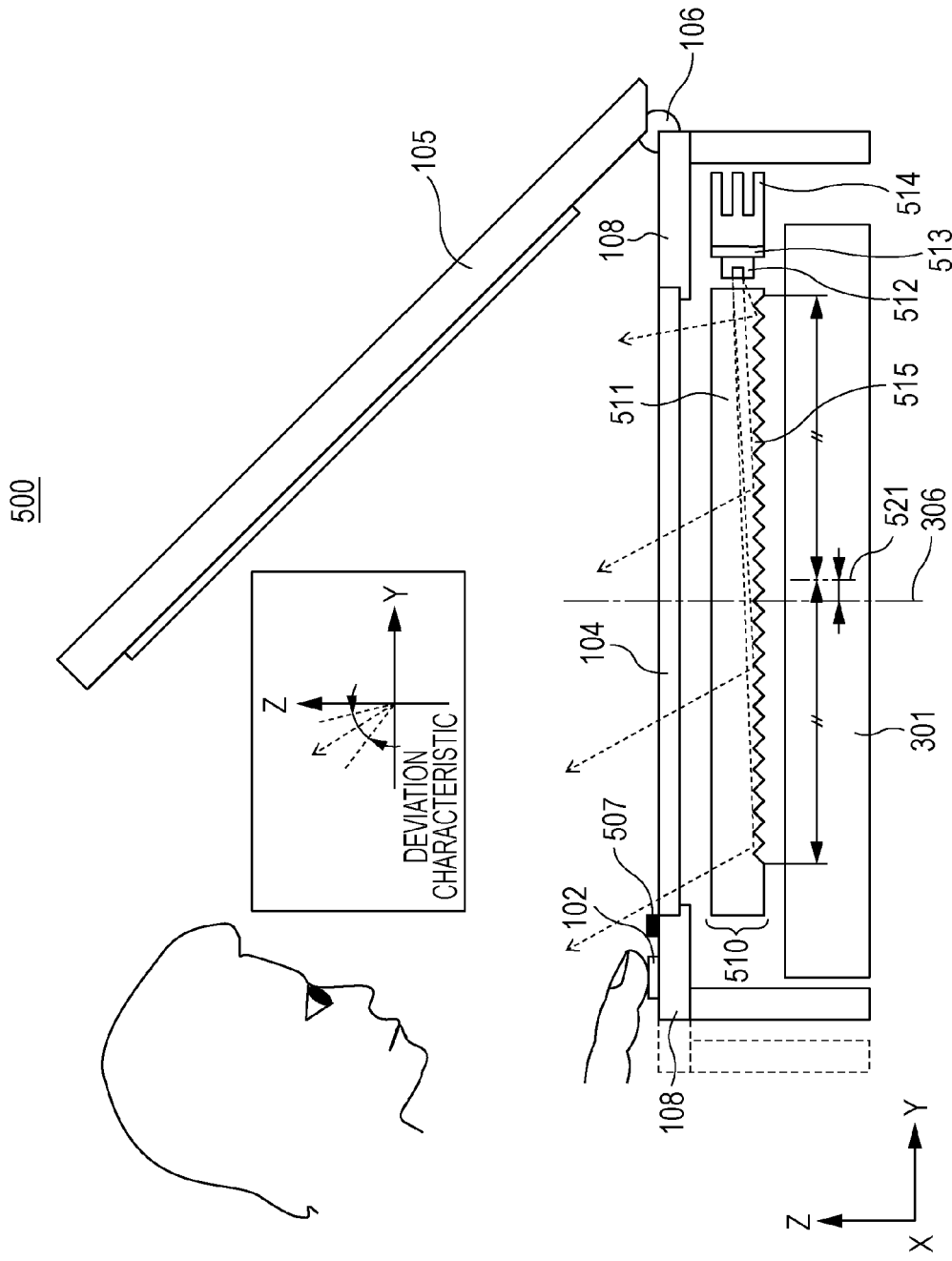

IMAGE READING DEVICE AND IMAGE FORMING APPARATUS INCLUDING AN ILLUMINATING UNIT AND AN ALIGNING PORTION FOR POSITIONING AN ORIGINAL

BACKGROUND OF THE INVENTION

1. Field of the Invention

The present invention relates to an image reading device and is suitable for a digital copying machine, an image scanner, and the like.

2. Description of the Related Art

Illuminating units included in known image reading devices employ light-emitting diodes (hereinafter abbreviated to LEDs) that are highly durable and highly efficient in light utilization. An image reading device disclosed by Japanese Patent Laid-Open No. 2012-160940 employs an illuminating unit including LED light sources that are provided at two respective long-side ends of a light-guiding member (the type of such an illuminating unit is hereinafter referred to as two-end source type), whereby the illuminance is increased and the nonuniformity in illuminance is reduced.

The illuminating unit of the two-end source type disclosed by Japanese Patent Laid-Open No. 2012-160940, however, needs to include spaces for providing the light sources at the two respective ends of the light-guiding member. Therefore, the size of such an image reading device tends to be large.

SUMMARY OF THE INVENTION

The present invention provides a compact image reading device and a compact image forming apparatus.

According to an aspect of the present invention, there is provided an image reading device including a platen on which an original is to be placed, an illuminating unit configured to illuminate the original, a linear sensor configured to receive light from the original, an optical unit configured to guide the light from the original to the linear sensor, and an aligning portion configured to determine a position of the original in a long-side direction of the linear sensor. The illuminating unit includes a light-guiding member extending in the long-side direction of the linear sensor, and a light source provided only at one long-side end of the light-guiding member. The aligning portion is provided on a side opposite to the light source in the long-side direction of the light-guiding member.

Further features of the present invention will become apparent from the following description of exemplary embodiments with reference to the attached drawings.

BRIEF DESCRIPTION OF THE DRAWINGS

FIG. 6B is a graph illustrating illuminance distributions observed with both of the light sources provided at the two respective ends of the image reading device according to the comparative embodiment.

FIG. 7 is a sectional view illustrating major elements of an image reading device according to a second embodiment of the present invention.

DESCRIPTION OF THE EMBODIMENTS

Figure 1:
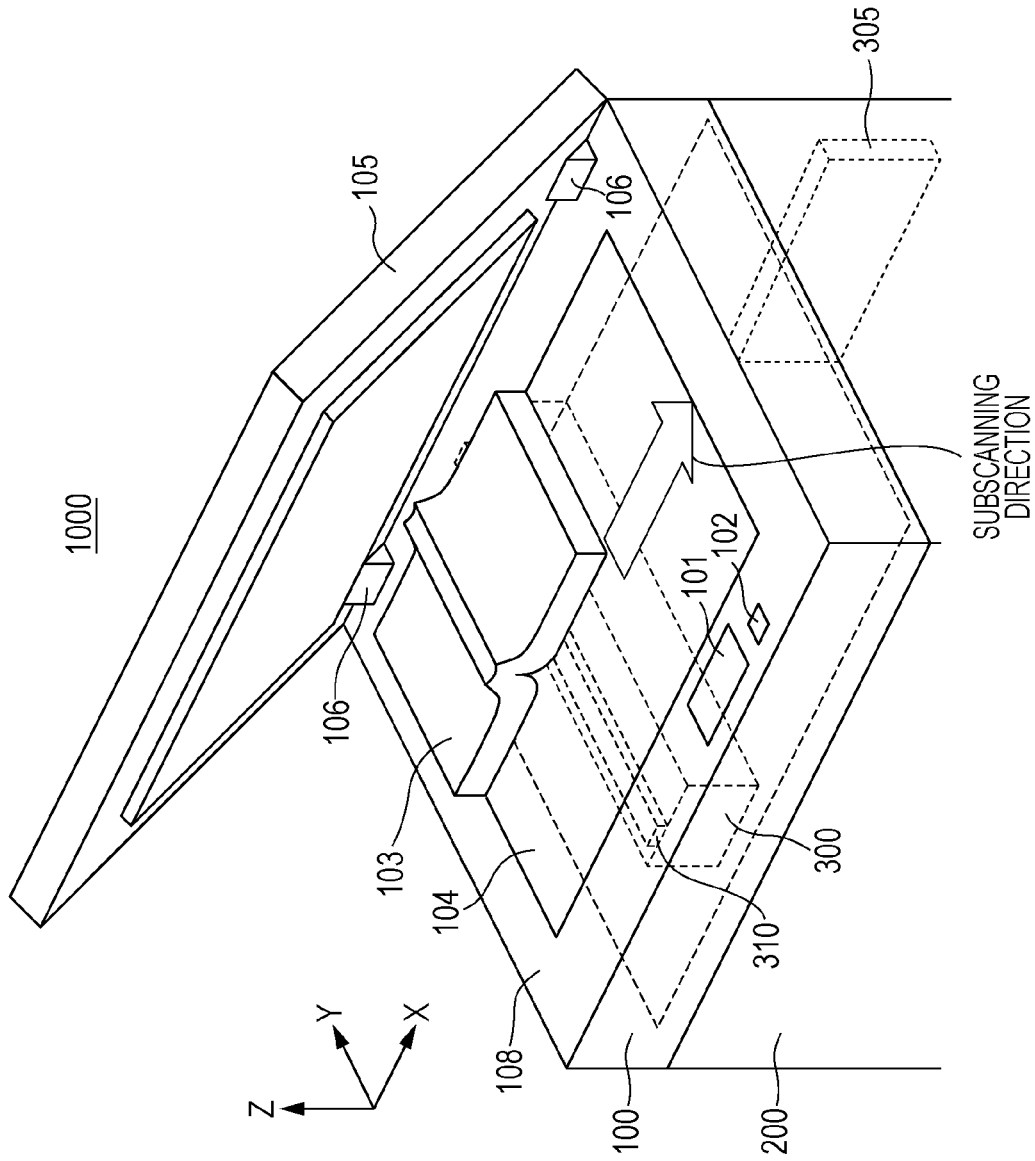
FIG. 1 is a schematic diagram illustrating major elements of an image forming apparatus according to a general embodiment of the present invention.

Embodiments of the present invention will now be described with reference to the attached drawings. Like elements illustrated in the drawings are denoted by like reference numerals, whereby redundant description thereof is omitted.

FIG. 1 is a schematic diagram illustrating major elements of an image forming apparatus 1000 according to a general embodiment of the present invention that includes an image reading device 100 and an image forming device 200. A user can give instructions to the image forming apparatus 1000 by using an operation portion 102 while checking information displayed on a display portion 101. The image reading device 100 according to the general embodiment is capable of reading an A3-size original and has a reading area (an illuminated area) of about 300 mm×420 mm.

The image reading device 100 includes a platen 104 on which an original 103 is to be placed, an original pressing plate 105 configured to press the original 103 against the platen 104, a holding portion 108 configured to hold the platen 104, and a carriage 300 provided below the platen 104. In the general embodiment, the platen 104 is made of glass, the original pressing plate 105 is attached to the holding portion 108 with hinge portions 106, and the carriage 300 is capable of scanning the original 103 while moving in an X direction (a subscanning direction).

Figure 2:
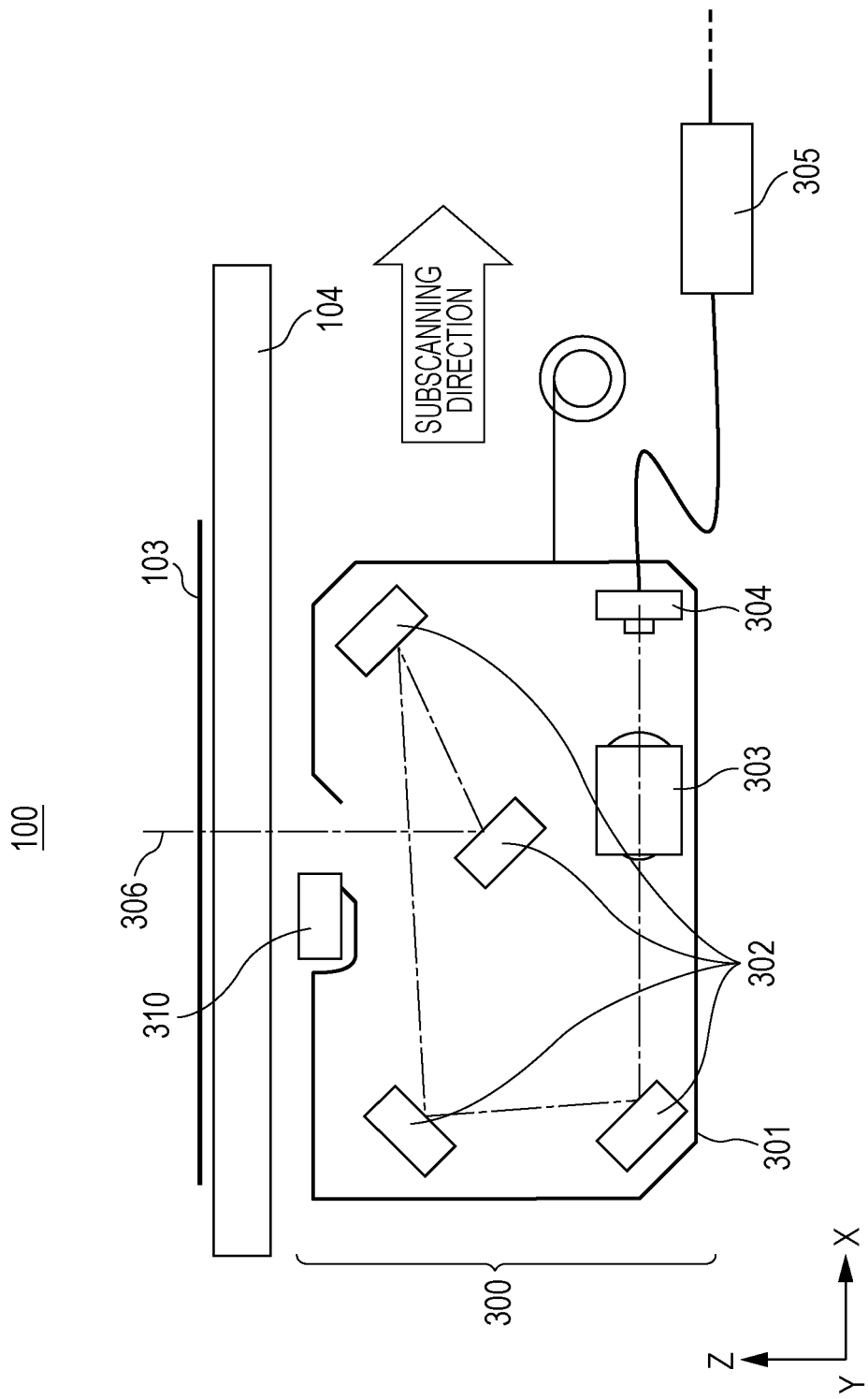
FIG. 2 is a sectional view illustrating major elements of a carriage according to the general embodiment of the present invention.

FIG. 2 is a sectional view of the carriage 300 taken along a Z-X plane. The carriage 300 includes a housing 301, an illuminating unit 310 configured to illuminate the original 103, a linear sensor 304 configured to receive light from the original 103, an optical unit 303 configured to guide the light from the original 103 to the linear sensor 304, and a plurality of mirrors 302 that reflect the light from the original 103 and are provided in an optical path between the original 103 and the optical unit 303. In the general embodiment, the optical unit 303 is a reduction imaging system, and the linear sensor 304 is a line sensor (including pixels that are arranged one-dimensionally in a Y direction) extending in the Y direction (a direction perpendicular to the page surface).

An image of the original 103 that is formed on the linear sensor 304 is transmitted as one-dimensional image information to a controller 305. The controller 305 receives a piece of one-dimensional image information every time the carriage 300 reads the original 103, thereby acquiring two-dimensional image information including a plurality of pieces of one-dimensional image information. Furthermore, the controller 305 corrects pieces of information on the color, contrast, and so forth of the image, converts the corrected pieces of information into signals, and transmits the signals to the image forming device 200. The image forming device 200 forms an image on a recording medium such as paper in an electrophotographic manner, an inkjet manner, or the like in accordance with the signals received from the controller 305.

The illuminating unit 310 according to the general embodiment includes a light-guiding member extending in a long-side direction of the linear sensor 304, and a light source provided only at one long-side end of the light-guiding member. Therefore, the image reading device 100 can have a smaller size and requires a smaller area of installation than the illuminating unit of the two-end source type. Furthermore, the image reading device 100 according to the general embodiment includes an aligning portion with reference to which the position of the original 103 in the long-side direction of the linear sensor 304 (the long-side direction of the light-guiding member) is determined. The aligning portion is provided on a side opposite the light source in the long-side direction of the light-guiding member. In such a configuration, even if the original 103 is lifted from the platen 104, the nonuniformity in illuminance that may occur because of a reduction in the illuminance at two ends of the illuminated area is reduced (details will be described separately below).

The image reading device 100 according to the general embodiment will further be described as more specific embodiments.

First Embodiment

Figure 3:
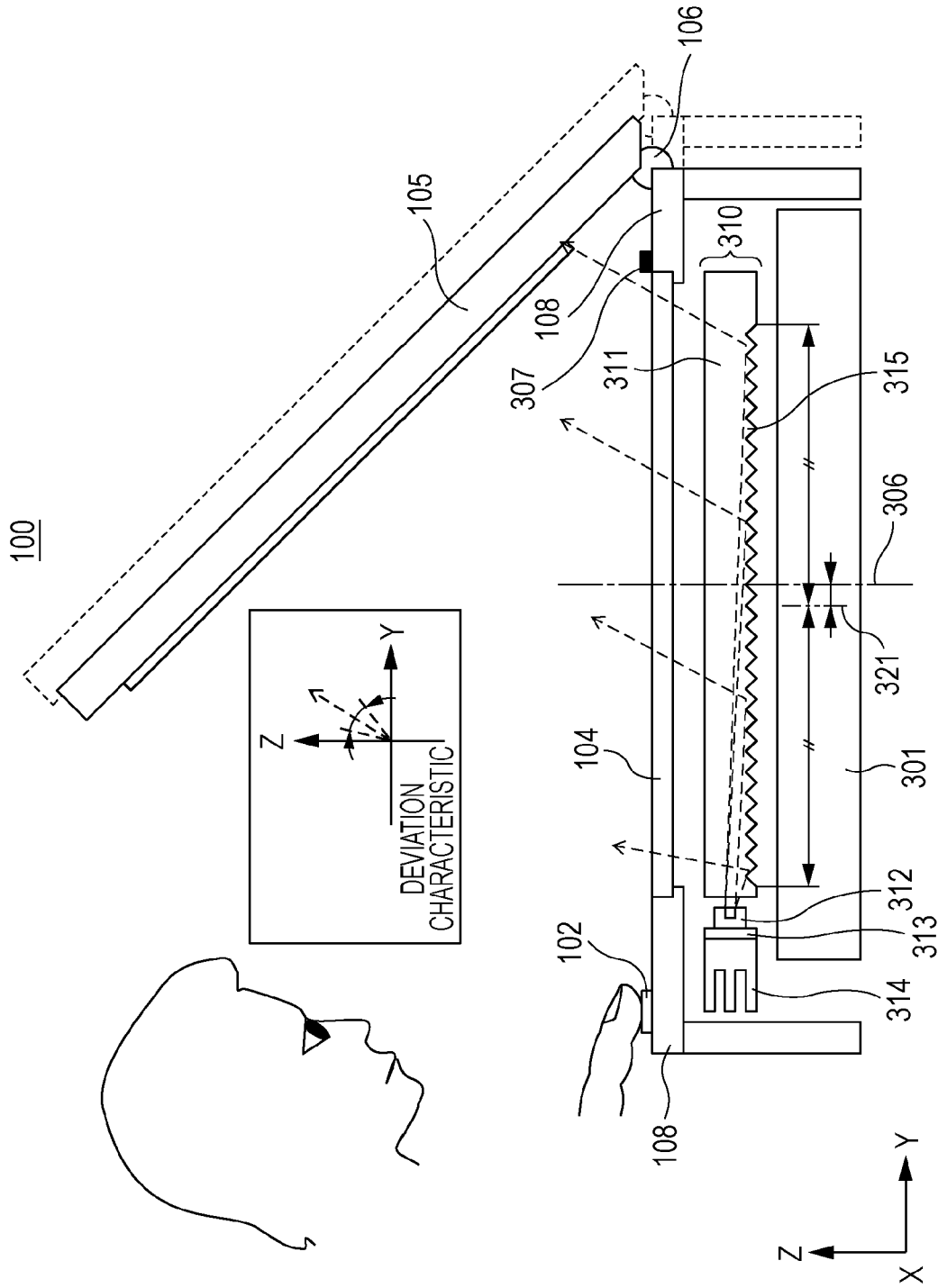
FIG. 3 is a sectional view illustrating major elements of an image reading device according to a first embodiment of the present invention.

An image reading device 100 according to a first embodiment of the present invention will now be described in detail. FIG. 3 is a schematic diagram (a sectional view taken along a Y-Z plane) illustrating major elements of the image reading device 100 according to the first embodiment. An illuminating unit 310 according to the first embodiment includes a light source (LED) 312 mounted on a substrate 313, a light-guiding member 311 having a plane of incidence on a side thereof facing the light source 312, and a heat sink 314 provided on the back side of the substrate 313 (on a side opposite the side on which the light source 312 is mounted) and that exhausts heat generated from the light source 312. The long-side direction of the light-guiding member 311 corresponds to the Y direction (a main scanning direction).

As illustrated in FIG. 3, the illuminating unit 310 employs a configuration in which the light source 312 is provided only at one long-side end (a −Y-side end) of the light-guiding member 311 (such a configuration is hereinafter referred to as one-end source type). In the one-end source type, the other long-side end (a +Y-side end) of the light-guiding member 311 is provided with no light source, substrate, or heat sink. Therefore, the length of the holding portion 108 in the Y direction can be made smaller than in the two-end source type. Thus, the image reading device 100 can have a small size.

The light-guiding member 311 has, at the bottom thereof, an optical surface (a secondary light-source surface) 315 in which a plurality of microscopic prisms (a group of secondary light sources) are aligned in the Y direction. The optical surface 315 behaves like a light source that emits light by itself. Such a behavior is based on total reflection. Accordingly, the light emitted from the optical surface 315 is characterized in traveling with an angular distribution deviating in a direction away from the light source 312 (such a characteristic is hereinafter referred to as deviation characteristic). In the first embodiment, the light reflected by the optical surface 315 has a deviation characteristic of traveling only toward a +Y side. The present inventor has focused on such a deviation characteristic observed in the one-end source type and has found that effects produced by providing the microscopic prisms are reduced near the +Y-side end of the light-guiding member 311.

Hence, in the light-guiding member 311 according to the first embodiment, a portion of the bottom surface thereof at the end on the side (the +Y side) opposite the light source 312 has no microscopic prisms. Furthermore, in the long-side direction of the light-guiding member 311 (the Y direction), the distance between a center axis 321 of the optical surface 315 and the light source 312 is shorter than the distance between an optical axis 306 defined by the optical unit 303 and the light source 312. That is, the center axis 321 of the optical surface 315 is intentionally shifted toward the light source 312 with respect to the optical axis 306 of the optical unit 303. With such a configuration, the size of the light-guiding member 311 is reduced. Moreover, the area of a mold that is to be processed for forming the light-guiding member 311 having the microscopic prisms from resin is reduced. Therefore, the abrasion of a cutting tool is suppressed, and the light-guiding member 311 is formed with high accuracy and at a low cost.

In a reduction imaging method employed in a reduction imaging system such as the image reading device 100 according to the first embodiment, the depth of field is larger than that of a device of a contact-image-sensor type that employs a 1×-magnification optical system. Hence, according to the reduction imaging method, satisfactory contrast performance is obtained even if the original is lifted from the platen by up to dozens of millimeters. In a commonly known image reading device, it is desired to maintain high and uniform illuminance even if the original is lifted to a significant height (over dozens of millimeters).

On the platen 104 (at a height of an illuminated surface of 0 mm), the illuminating unit 310 substantially uniformly illuminates the entirety of an area extending from the end on the side (the −Y side) nearer to the light source 312 to the end on the side (the +Y side) opposite the light source 312. As described above, however, the light reflected by the optical surface 315 has a deviation characteristic of traveling only toward the +Y side. Hence, as the height of the illuminated surface increases, the distribution of the quantity of illuminating light deviates toward the side (+Y side) opposite the light source 312. That is, because of the above deviation characteristic, the quantity of illuminating light on the side nearer to the light source 312 in the Y direction is significantly reduced with the increase in the height of the illuminated surface.

Hence, the first embodiment employs a configuration in which an aligning portion 307 with reference to which the position of the original 103 in the Y direction is determined is provided at a position corresponding to the end of the light-guiding member 311 that is on the side (+Y side) opposite the light source 312 in the Y direction. In such a configuration, the original 103 is positioned away from a side of the platen 104 that is nearer to the light source 312 in the Y direction. Therefore, in combination with the deviation characteristic observed in the one-end source type, the quantity of light is maintained to be substantially constant even if the height of the illuminated surface changes. That is, even if the original 103 is lifted from the platen 104, the uniformity in the illuminance of the light applied to the original 103 is maintained.

Figure 4:
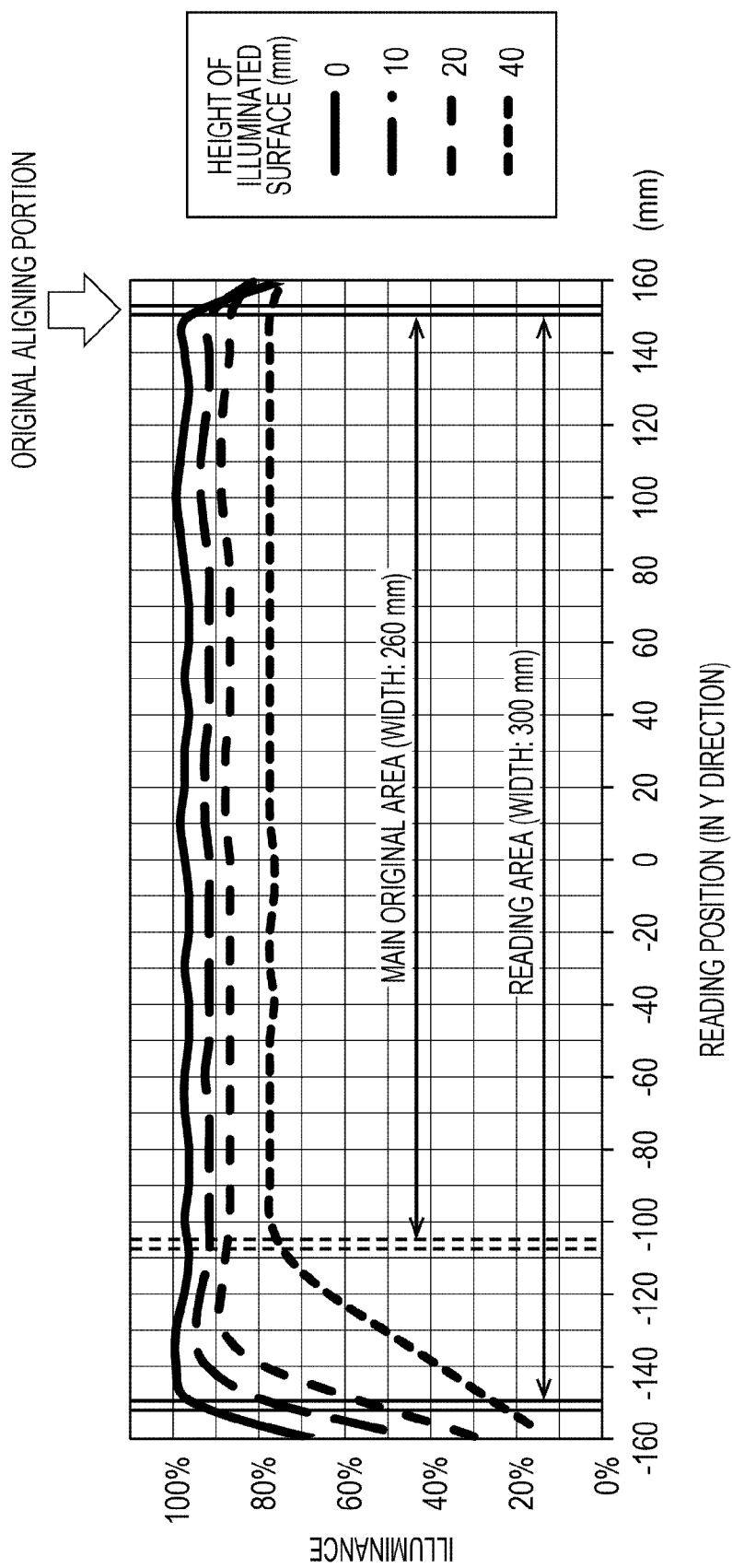
FIG. 4 is a graph illustrating illuminance distributions observed in the first embodiment of the present invention.

FIG. 4 is a graph illustrating illuminance distributions that are observed when light is emitted from the light source 312 provided at one end of the light-guiding member 311 of the image reading device 100 according to the first embodiment. In FIG. 4, the horizontal axis represents the reading position in the Y direction (the main-scan reading position), and the vertical axis represents the illuminance ratio (the relative value of illuminance with the peak value being 100%) of the light received by the linear sensor 304. The curves represent illuminance distributions observed with respective amounts of lifting of the surface of the original 103 (at respective heights of the illuminated surface) from the platen 104. The original 103 is positioned within the reading area (an area to be illuminated by the illuminating unit 310) on the platen 104.

Such a reduction imaging method has a problem in that the quantity of light received at an end of the linear sensor 304 is reduced because of the field-angle characteristic (the cosine-fourth-power law) of the optical unit 303 even if the original 103 is not lifted. To solve this problem, in the first embodiment, the microscopic prisms are provided appropriately in the light-guiding member 311, whereby the illuminance ratio at a height of the illuminated surface of 0 mm is made substantially uniform over the entirety of the reading area as graphed in FIG. 4.

Referring to FIG. 4, however, as the height of the illuminated surface increases, the illuminance ratio at one end (the −Y-side end) of the reading area is reduced. At a height of the illuminated surface of 40 mm, the illuminance ratio at the −Y-side end of the reading area is reduced to about 20%. In general, the bound portion of a thick original, such as a dictionary, tends to reside at a large height. The lengths of many such originals in the Y direction are about 260 mm.

In a case where such an original is placed on the platen 104 while being aligned with reference to the aligning portion 307 according to the first embodiment, a main original area represented in FIG. 4 is to be read. In this case, as can be seen from FIG. 4, the illuminance ratio is substantially uniform over the entirety of the main original area at any height of the illuminated surface. Thus, in the first embodiment, since the aligning portion 307 is provided on the other end (the +Y-side end) of the reading area, i.e., the side opposite the light source 312, the influence of the reduction in the illuminance ratio at the −Y-side end is avoided.

In the first embodiment, the aligning portion 307 is provided on the holding portion 108. The aligning portion 307 may be provided at any other position, for example, a position on the platen 104, as long as the position of the original 103 in the Y direction is determinable. In the first embodiment, the aligning portion 307 is provided such that a surface (an aligning surface) thereof with which the original 103 comes into contact extends in a direction (the X direction) perpendicular to the long-side direction of the light-guiding member 311 (the Y direction). That is, the aligning portion 307 has a continuous aligning surface whose long-side direction corresponds to the X direction. The term "perpendicular" used herein includes "substantially perpendicular". Hence, as long as the position of the original 103 in the Y direction is determinable, the aligning surface does not necessarily extend exactly in the X direction or is not necessarily continuous.

In the image reading device 100 according to the first embodiment, as illustrated in FIG. 3, the hinge portions 106 with which the original pressing plate 105 is openable and closable are provided on the side (the +Y side) opposite the light source 312 in the Y direction. In such a configuration, the user inevitably stands on the side nearer to the light source 312 so as to open or close the original pressing plate 105. In this state, the illuminating light that has been reflected by the optical surface 315 travels only toward the +Y side because of the above-described deviation characteristic of the one-end source type. Therefore, the illuminating light is prevented from entering the eyes of the user. If an original such as a dictionary is to be read, since such an original has a width smaller than that of an A3-size original, a large quantity of illuminating light leaks from the reading area. Hence, the above effect is exerted more advantageously.

Referring now to FIG. 1, the controller 305 included in the image forming apparatus 1000 is provided on a side nearer to the hinge portions 106 (on the +Y side), i.e., a side opposite a user side (the −Y side). This is because of the following reasons. The display portion 101 and the operation portion 102 are provided on the user side. Furthermore, spaces for supplying toner, ink, and pieces of paper and for other kinds of work need to be provided on the user side of the image forming device 200. Such circumstances makes it difficult to provide the controller 305 on the user side.

Hence, as a matter of convenience in design, electronic components such as the light source 312 included in the illuminating unit 310 may be typically provided on the +Y side, as with the controller 305, so that the distance between each of those electronic components and the controller 305 that are connected to each other is reduced. In the image forming apparatus 1000 including the image reading device 100 according to the first embodiment, however, the electronic components such as the light source 312 are intentionally provided on the user side (the −Y side) that is opposite the controller 305, whereby the above-described advantageous effect is exerted.

As illustrated in FIG. 3, if the aligning portion 307 has a color that is different from that of a member, such as the holding portion 108, provided adjacent thereto, the user can visually identify the aligning portion 307 more easily. Such a configuration contributes to accurate positioning of the original 103. The aligning portion 307 may be colored over the entirety thereof or only partially (as patterns or characters).

When the length of the illuminated area (reading area) illuminated by the illuminating unit 310 is 250 mm or larger in the long-side direction of the light-guiding member 311 (the Y direction), the above-mentioned problems (the nonuniformity in illuminance and the leakage of illuminating light) are particularly pronounced and the effects produced in the first embodiment of the present invention are exerted more advantageously. In the first embodiment, since the illuminated area is set to a size of about 300 mm×420 mm so that an A3-size original is readable, the advantageous effects produced in the first embodiment of the present invention are satisfactorily exerted.

To summarize, the image reading device 100 according to the first embodiment has a small size, which contributes to a small installation area. Furthermore, even if the original 103 is lifted from the platen 104, the nonuniformity in illuminance is reduced. Furthermore, the illuminating light emitted from the illuminating unit 310 is prevented from entering the eyes of the user and dazzling the user (giving discomfort to the user).

Comparative Embodiment

Figure 5:
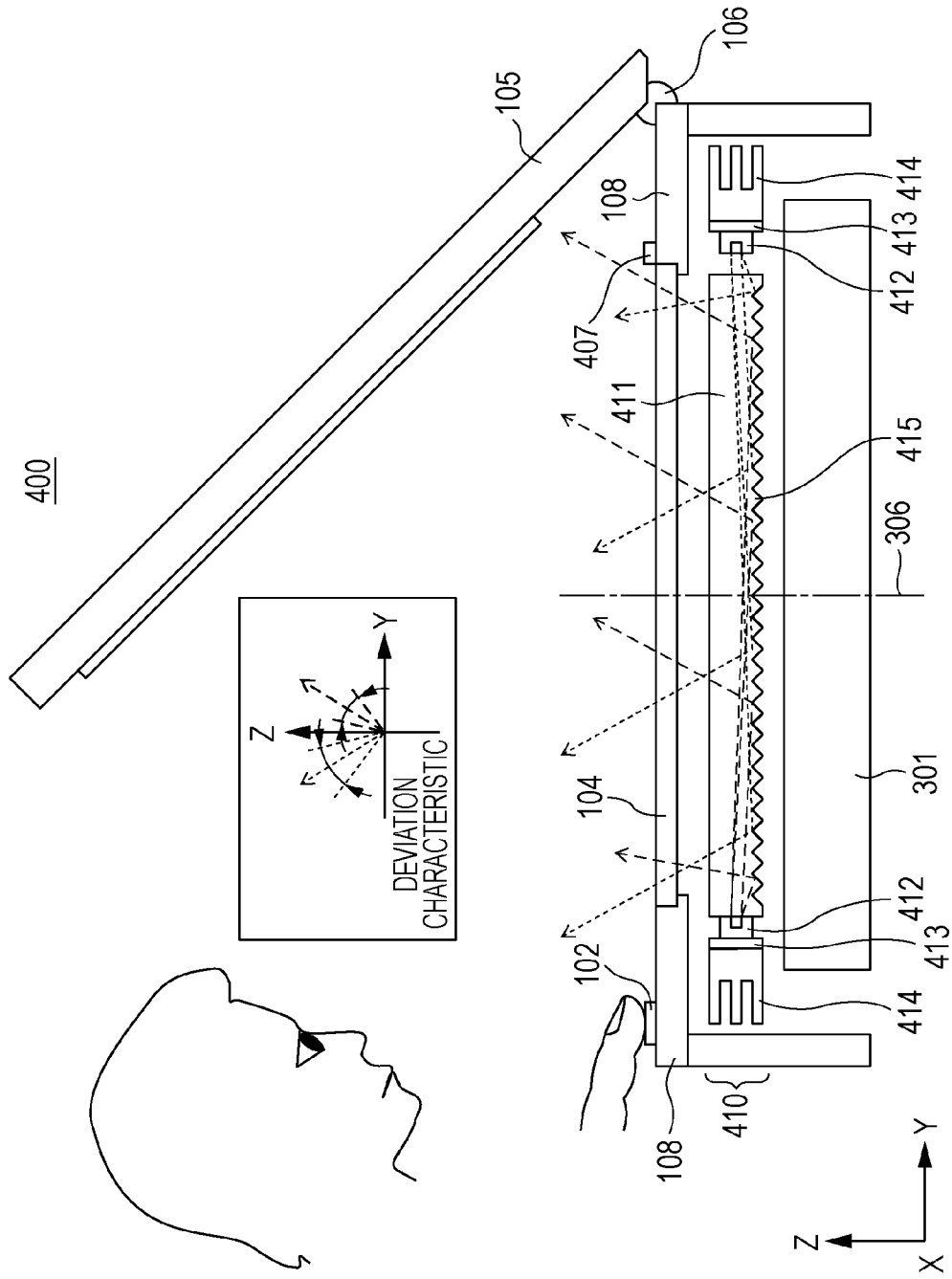
FIG. 5 is a sectional view illustrating major elements of an image reading device according to a comparative embodiment.

A comparative embodiment with respect to the first embodiment of the present invention will now be described. FIG. 5 is a schematic diagram (a sectional view taken along the Y-Z plane) illustrating major elements of an image reading device 400 according to the comparative embodiment. The comparative embodiment differs from the first embodiment in that the image reading device 400 includes an illuminating unit 410 of the two-end source type and that microscopic prisms are provided over the entirety of the bottom surface of a light-guiding member 411. That is, the illuminating unit 410 includes a light source 412, a substrate 413, and a heat sink 414 that are provided at each of two long-side (Y-direction)

ends of the light-guiding member 411 and has a configuration in which the center axis of an optical surface 415 coincides with the optical axis 306 of the optical unit 303.

Figure 6A:
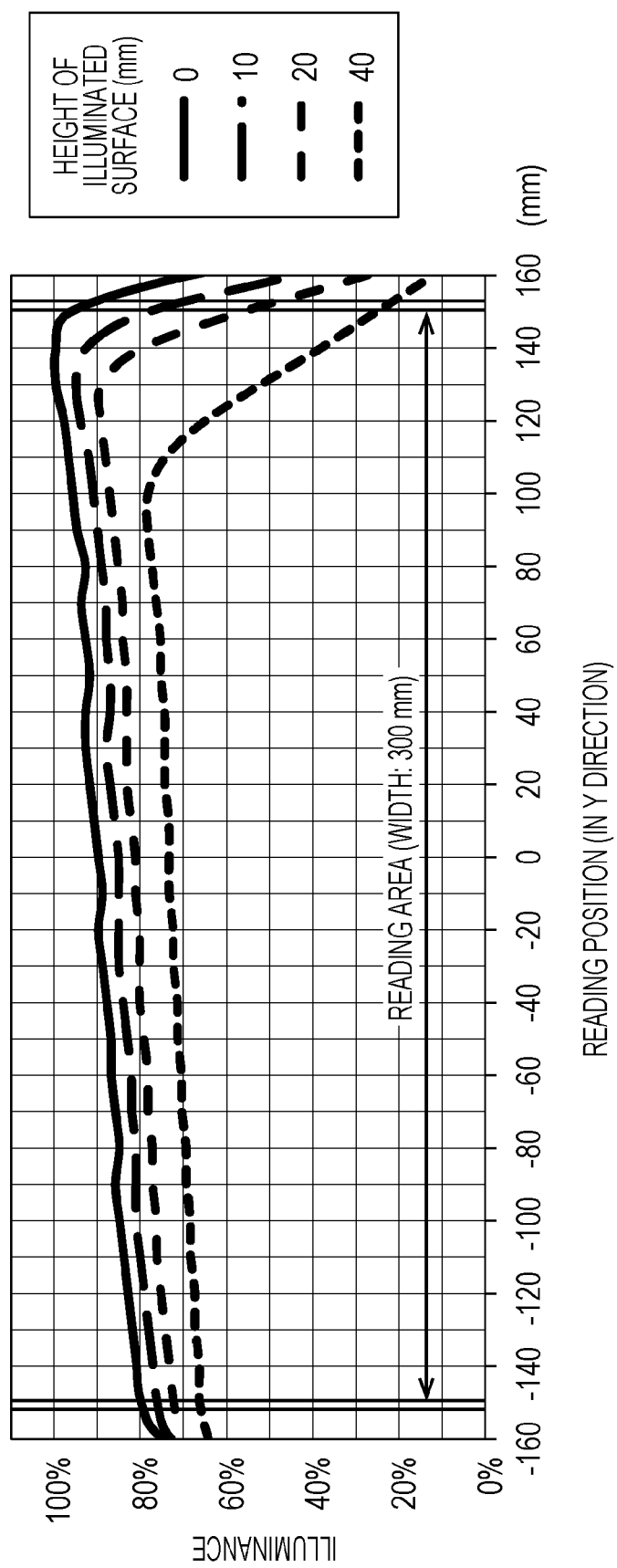
FIG. 6A is a graph illustrating illuminance distributions observed with one of light sources provided at two respective ends of the image reading device according to the comparative embodiment.

FIG. 6A is a graph corresponding to FIG. 4 and illustrating illuminance distributions that are observed in the image reading device 400 according to the comparative embodiment when light is emitted from only the light source 412 provided at the +Y-side end of the light-guiding member 411. Illuminance distributions that are observed when light is emitted from only the light source 412 provided at the −Y-side end of the light-guiding member 411 are obtained by horizontally inverting the illuminance distributions graphed in FIG. 6A. In FIG. 6A, as the height of the illuminated surface increases, the center of the illuminance distribution deviates in a direction away from the +Y-side end because of the deviation characteristic that is observed by allowing only the light source 412 on the +Y side to emit light. The illuminance ratio sharply drops at a position near the light source 412. At a height of the illuminated surface of 40 mm, the illuminance ratio at the +Y-side end of the reading area drops to about 25%.

Hence, in the comparative embodiment, both of the light sources 412 provided at the two respective ends of the light-guiding member 411 are allowed to emit light simultaneously, whereby illuminance distributions graphed in FIG. 6B are obtained as a combination of the illuminance distributions graphed in FIG. 6A and the illuminance distributions as horizontal inversions thereof. As can be seen from FIG. 6B, at a height of the illuminated surface of 0 mm, the illuminance ratio is substantially uniform over the entirety of the main reading area, as in the first embodiment. Compared with the illuminance distributions graphed in FIG. 6A, the illuminance ratios at the two respective ends of the reading area observed when the original 103 is lifted are increased in the illuminance distributions graphed in FIG. 6B.

In the comparative embodiment, however, the reduction in the illuminance ratio at the two ends of the reading area due to the increase in the height of the illuminated surface is not suppressed completely. For example, at a height of the illuminated surface of 40 mm, the illuminance ratio at the two ends of the reading area is reduced to about 50%. Hence, in the image reading device 400 according to the comparative embodiment, even if an aligning portion 407 is provided at the end on the side (the +Y side) opposite the light source 412 provided at the −Y-side end in the Y direction as in the first embodiment, the illuminance distribution in the main original area becomes nonuniform. Nevertheless, if the original 103 is placed away from the aligning portion 407, adverse influences due to the reduction in the illuminance ratio are reduced. In such a case, however, the original 103 is not positioned with reference to the aligning portion 407, which is impractical.

If the original 103 is read by using the illuminating unit 410 according to the comparative embodiment that is of the two-end source type, the above-described nonuniformity in illuminance may adversely affect the resulting image in various ways. For example, if an original 103, such as a dictionary whose pages have a white base color, is read as a color or gray-scale image represented with gradation, the resulting image may have nonuniformity appearing as a change of the color from white to gray near an end of the bound portion of the original 103. For another example, if the above original 103 is read as a binary image represented by black and white with no gradation, a base portion (a portion having no printed images) of the original 103 near the end of the bound portion may be read as black. In such a case, characters and so forth printed on that portion may disappear.

In the illuminating unit 410 according to the comparative embodiment illustrated in FIG. 5, rays emitted from the −Y-side end and the +Y-side end and reflected by the optical surface 415 have deviation characteristics of traveling toward the +Y side and the −Y side, respectively. Hence, in the image reading device 400 according to the comparative embodiment, even if the hinge portions 106 are provided on the side (+Y side) opposite the light source 412 provided at the −Y-side end in the Y direction as in the first embodiment, rays traveling toward the −Y side are not prevented from entering the eyes of the user.

As described above, the illuminating unit 410 according to the comparative embodiment is of the two-end source type. Therefore, unlike the illuminating unit 310 according to the first embodiment, the area of the optical surface 415 cannot be reduced, and the center axis of the optical surface 415 in the Y direction cannot be shifted with respect to the optical axis 306 of the optical unit 303. Hence, in the comparative embodiment, the size reduction of the light-guiding member 411 and the high-accuracy, low-cost processing of the mold for the light-guiding member 411 are not realized.

Second Embodiment

An image reading device 500 according to a second embodiment of the present invention will now be described in detail. FIG. 7 is a schematic diagram (a sectional view taken along the Y-Z plane) illustrating major elements of the image reading device 500 according to the second embodiment. The second embodiment differs from the first embodiment in that a light source 512 and an aligning portion 507 of the image reading device 500 are each provided on a side opposite a corresponding one of the light source 312 and the aligning portion 307 of the image reading device 100. That is, in the image reading device 500, an illuminating unit 510 includes the light source 512 only at one long-side end (the +Y-side end) of a light-guiding member 511 while the aligning portion 507 is provided on a side (−Y side) opposite the light source 512 in the Y direction.

As illustrated in FIG. 7, the illuminating unit 510 includes no light source, substrate, or heat sink at the other long-side end (the −Y-side end) of the light-guiding member 511. Hence, the length of the holding portion 108 in the Y direction can be made smaller than in the illuminating unit of the two-end source type, leading to the realization of a size reduction of the image reading device 500. Particularly, in the second embodiment, the length of the holding portion 108 can be shortened on the user side (−Y side). Therefore, even a user who is short can easily place the original 103 on the platen 104.

In the second embodiment, the light emitted from the light source 512 and reflected by an optical surface 515 of the light-guiding member 511 has a deviation characteristic of traveling only toward the −Y side, which is opposite to the characteristic observed in the first embodiment. Hence, in the light-guiding member 511 according to the second embodiment, the area having no microscopic prisms is provided at the −Y-side end of the bottom surface. Furthermore, a center axis 521 of the optical surface 515 in the Y direction is intentionally shifted toward the side (+Y side) opposite the light source 512 with respect to the optical axis 306 defined by the optical unit 303. With such a configuration, the size reduction of the light-guiding member 511 and the high-accuracy, low-cost processing of the mold for the light-guiding member 511 are realized as in the first embodiment.

In the second embodiment also, since the aligning portion 507 is provided on the side (−Y side) opposite the light source 512, even if the original 103 is lifted from the platen 104, the uniformity in the illuminance of the light applied to the original 103 is maintained by utilizing the deviation characteristic as in the first embodiment. Such an advantageous effect will now be described more specifically with reference to FIG. 8.

Figure 8:
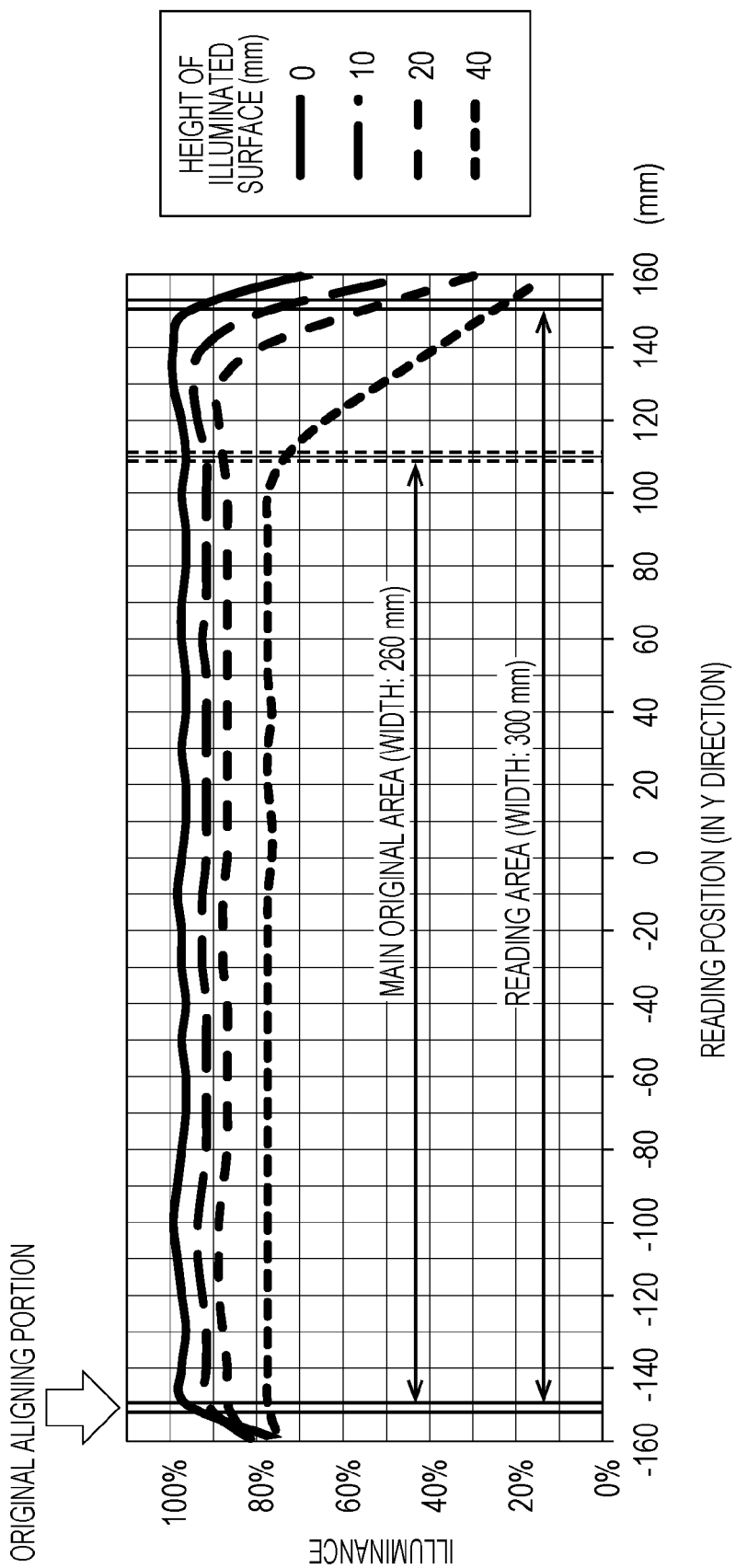
FIG. 8 is a graph illustrating illuminance distributions observed in the second embodiment of the present invention.

FIG. 8 is a graph corresponding to FIG. 4 and illustrating illuminance distributions that are observed when light is emitted from the light source 512 provided at one end of the illuminating unit 510 of the image reading device 500 according to the second embodiment. As graphed in FIG. 8, the illuminance ratio at a height of the illuminated surface of 0 mm is substantially uniform over the entirety of the reading area, whereas the illuminance at the one end (the +Y-side end) of the reading area is reduced as the height of the illuminated surface increases. Nevertheless, in the second embodiment, the aligning portion 507 is provided at the other end (the −Y-side end) of the reading area, i.e., on the side opposite the light source 512. Therefore, the illuminance ratio is substantially uniform over the entirety of the main original area at any height of the illuminated surface.

To summarize, the image reading device 500 according to the second embodiment has a small size, which contributes to a small installation area. Furthermore, even if the original 103 is lifted from the platen 104, the nonuniformity in illuminance is reduced.

Third Embodiment

Figure 9:
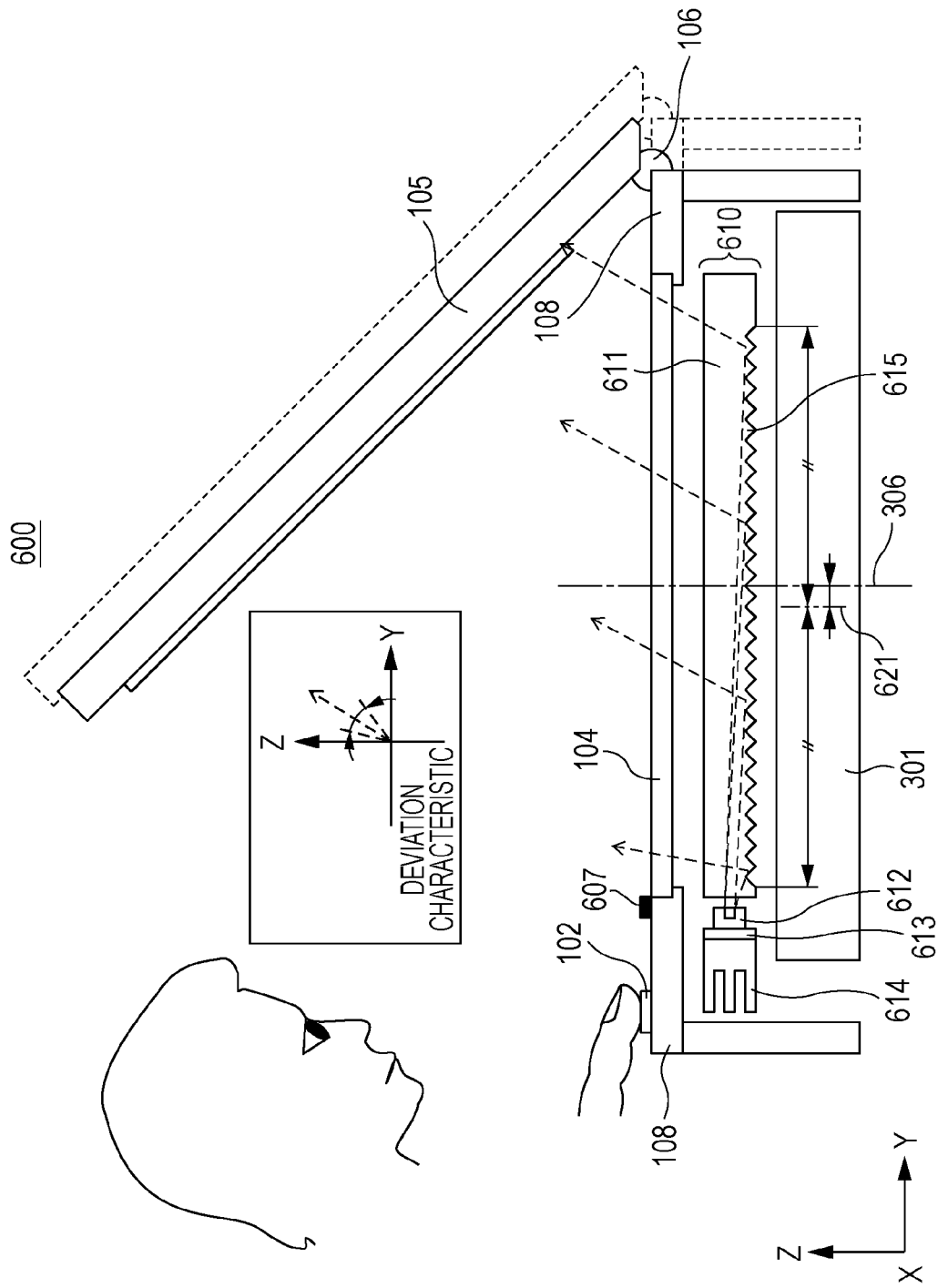
FIG. 9 is a sectional view illustrating major elements of an image reading device according to a third embodiment of the present invention.

An image reading device 600 according to a third embodiment of the present invention will now be described in detail. FIG. 9 is a schematic diagram (a sectional view taken along the Y-Z plane) illustrating major elements of the image reading device 600 according to the third embodiment. The third embodiment differs from the first embodiment in that an aligning portion 607 of the image reading device 600 is provided on a side opposite the aligning portion 307 of the image reading device 100. That is, an illuminating unit 610 included in the image reading device 600 includes a light source 612 only at one long-side end (the −Y-side end) of a light-guiding member 611, and the aligning portion 607 is provided on the same side (−Y side) as the light source 612 in the Y direction.

As illustrated in FIG. 9, the illuminating unit 610 includes no light source, substrate, or heat sink at the other long-side end (the +Y-side end) of the light-guiding member 611. Hence, the length of the holding portion 108 in the Y direction can be made smaller than in the illuminating unit of the two-end source type, leading to the realization of a size reduction of the image reading device 600.

In the third embodiment, the light emitted from the light source 612 and reflected by an optical surface 615 of the light-guiding member 611 has a deviation characteristic of traveling only toward the +Y side as in the first embodiment. Hence, in the light-guiding member 611 according to the third embodiment, the area having no microscopic prisms is provided at the +Y-side end of the bottom surface. Furthermore, a center axis 621 of the optical surface 615 in the Y direction is intentionally shifted toward the light source 612 (toward the −Y side) with respect to the optical axis 306 defined by the optical unit 303. With such a configuration, the size reduction of the light-guiding member 611 and the high-accuracy, low-cost processing of the mold for the light-guiding member 611 are realized as in the first embodiment.

In the third embodiment also, the hinge portions 106 are provided on the side (+Y side) opposite the light source 612 in the Y direction as in the first embodiment. Therefore, in combination with the effect of the above deviation characteristic, the illuminating light is prevented from entering the eyes of the user. Furthermore, in the image forming apparatus 1000 including the image reading device 600 according to the third embodiment, the electronic components such as the light source 612 are intentionally provided on the user side (on the −Y side) that is opposite the controller 305, whereby the above-described advantageous effect is exerted.

Figure 10:
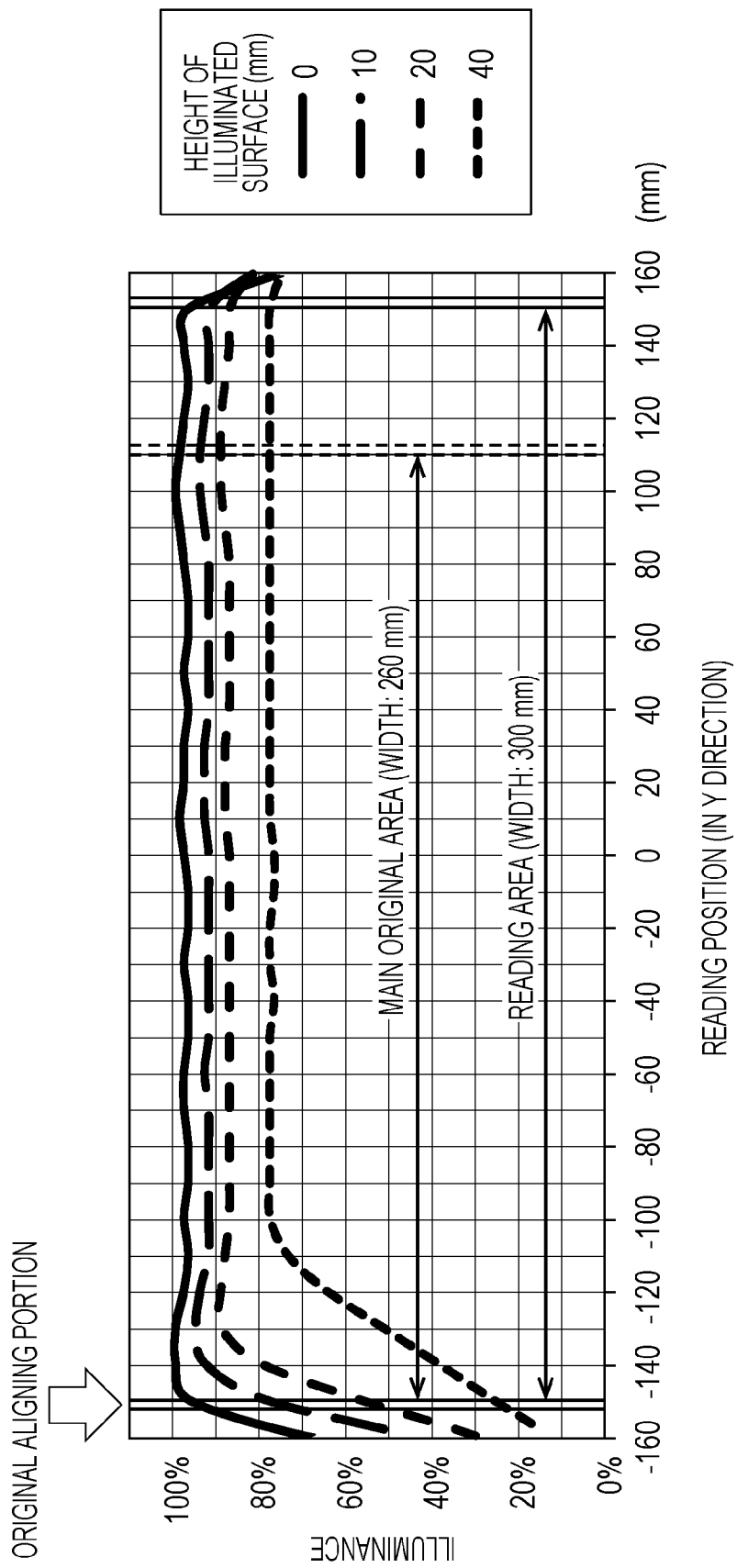
FIG. 10 is a graph illustrating illuminance distributions observed in the third embodiment of the present invention.

FIG. 10 is a graph corresponding to FIG. 4 and illustrating illuminance distributions that are observed when light is emitted from the light source 612 provided at one end of the illuminating unit 610 of the image reading device 600 according to the third embodiment. As graphed in FIG. 10, the illuminance ratio at a height of the illuminated surface of 0 mm is substantially uniform over the entirety of the reading area, whereas the illuminance ratio at one end (the −Y-side end) of the reading area is reduced as the height of the illuminated surface increases.

In the third embodiment, the aligning portion 607 is provided at the −Y-side end of the reading area, i.e., the side having the light source 612. Hence, if the original 103 is lifted from the platen 104, the illuminance ratio at the −Y-side end in the main original area is reduced. Nevertheless, since the aligning portion 607 is provided on the user side (−Y side), the load applied to the user placing the original 103 on the platen 104 is smaller than in the first embodiment. Therefore, the image reading device 600 is easy to use even by a user who is short.

To summarize, the image reading device 600 according to the third embodiment has a small size, which contributes to a small installation area. Furthermore, the illuminating light from the illuminating unit 610 is prevented from entering the eyes of the user.

Modifications

While some specific embodiments of the present invention have been described above, the present invention is not limited thereto. Various changes and modifications can be made to the above embodiments within the scope of the present invention.

For example, while each of the above embodiments employs an LED as the light source, the light source may be an electroluminescent light source (such as an organic light-emitting diode), a light bulb, or the like. Furthermore, while each of the above embodiments employs a line sensor including pixels that are arranged one-dimensionally as the linear sensor, the linear sensor may include a plurality of such line sensors that are arranged side by side in the short-side direction.

The material of the platen is not limited to glass and may be resin or the like. The material of the light-guiding member is not limited to resin and may be glass or the like. The plurality of microscopic prisms provided to the light-guiding member may each have a mountain-like shape or a trapezoidal shape. The optical surfaces forming the microscopic prisms are not limited to flat surfaces and may be curved surfaces. Moreover, the light-guiding member may be a plate-like member such as a reflector.

While each of the above embodiments is based on an assumption that a thick original such as a dictionary (an original having a bound portion) is to be read, the present invention is not limited to such a case. The advantageous effects of the present invention are also exerted in a case where an original having a wavy surface, a three-dimensional original, or the like is to be read.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-123216 filed Jun. 11, 2013, and Japanese Patent Application No. 2013-123217 filed Jun. 11, 2013, which are hereby incorporated by reference herein in their entirety.

What is claimed is:

1. An image reading device comprising:
a platen on which an original is to be placed;
an illuminating unit configured to illuminate the original;
a linear sensor extending in a first direction and configured to receive light from the original;
an optical unit configured to guide the light from the original to the linear sensor; and
an aligning portion configured to determine a position of the original in the first direction,
wherein the illuminating unit includes
a light-guiding member extending in the first direction, wherein the light-guiding member includes an optical surface provided with a plurality of prisms that are arranged in the first direction; and
a light source provided only at one end of the light-guiding member in the first direction,
wherein, in the first direction, a distance between a center axis of the optical surface and the light source is shorter than a distance between an optical axis defined by the optical unit and the light source,
wherein the illuminating unit illuminates the original only from the one end side in the first direction, and
wherein the aligning portion is provided on a side opposite to the light source in the first direction.

2. The image reading device according to claim 1, wherein a surface of the aligning portion with which the original comes into contact extends in a direction perpendicular to the first direction.

3. The image reading device according to claim 1, wherein, in the first direction, a length of an illuminated area illuminated by the illuminating unit is at least 250 mm.

4. The image reading device according to claim 1, wherein the aligning portion has a color different from a color of a member provided adjacent to the aligning portion.

5. An image forming apparatus comprising:
an image reading device including
a platen on which an original is to be placed,
an illuminating unit configured to illuminate the original,
a linear sensor extending in a first direction and configured to receive light from the original,
an optical unit configured to guide the light from the original to the linear sensor, and
an aligning portion configured to determine a position of the original in the first direction; and
an image forming device configured to form an image of the original that has been read by the linear sensor on a recording medium,
wherein the illuminating unit includes
a light-guiding member extending in the first direction, wherein the light-guiding member includes an optical surface provided with a plurality of prisms that are arranged in the first direction; and
a light source provided only at one end of the light-guiding member in the first direction,
wherein, in the first direction, a distance between a center axis of the optical surface and the light source is shorter than a distance between an optical axis defined by the optical unit and the light source,
wherein the illuminating unit illuminates the original only from the one end side in the first direction, and
wherein the aligning portion is provided on a side opposite to the light source in the first direction.

6. The image forming apparatus according to claim 5, further comprising:
a controller configured to convert information acquired from the image reading device into a signal and transmit the information to the image forming device,
wherein the controller is provided on the side opposite to the light source in the first direction.

7. An image reading device comprising:
a platen on which an original is to be placed;
an illuminating unit configured to illuminate the original;
a linear sensor extending in a first direction and configured to receive light from the original;
an optical unit configured to guide the light from the original to the linear sensor;
an original pressing plate configured to press the original against the platen; and
a hinge portion with which the original pressing plate is openable and closeable,
wherein the illuminating unit includes
a light-guiding member extending in the first direction, wherein the light-guiding member includes an optical surface provided with a plurality of prisms that are arranged in the first direction; and
a light source provided only at one end of the light-guiding member in the first direction,
wherein, in the first direction, a distance between a center axis of the optical surface and the light source is shorter than a distance between an optical axis defined by the optical unit and the light source,
wherein the illuminating unit illuminates the original only from the one end side in the first direction, and
wherein the hinge portion is provided on a side opposite to the light source in the first direction.

8. The image reading device according to claim 7, wherein, in the first direction, a length of an illuminated area illuminated by the illuminating unit is at least 250 mm.

9. The image reading device according to claim 7, wherein the optical unit is a reduction imaging system.

10. An image reading device comprising:
a platen on which an original is to be placed;
an illuminating unit configured to illuminate the original;
a sensor extending in a first direction and configured to receive light from the original;
an optical unit configured to guide the light from the original to the sensor; and
an aligning portion configured to determine a position of the original in the first direction, p1 wherein the illuminating unit includes
a light-guiding member extending in the first direction; and
a light source provided only at one end of the light-guiding member in the first direction,
wherein the light-guiding member includes an optical surface configured to reflect the light from the light source,
wherein, in the first direction, a distance between a center axis of the optical surface and the light source is shorter than a distance between an optical axis defined by the optical unit and the light source, and wherein the aligning portion is provided on a side opposite to the light source in the first direction.

11. An image reading device comprising:
a platen on which an original is to be placed;
an illuminating unit configured to illuminate the original;
a sensor extending in a first direction and configured to receive light from the original;
an optical unit configured to guide the light from the original to the sensor;
an original pressing plate configured to press the original against the platen; and
a hinge portion with which the original pressing plate is openable and closeable,
wherein the illuminating unit includes
  a light-guiding member extending in the first direction; and
  a light source provided only at one end of the light-guiding member in the first direction,
    wherein the light-guiding member includes an optical surface configured to reflect the light from the light source,
    wherein, in the first direction, a distance between a center axis of the optical surface and the light source is shorter than a distance between an optical axis defined by the optical unit and the light source, and
wherein the hinge portion is provided on a side opposite to the light source in the first direction.

* * * * *